Figure 2:
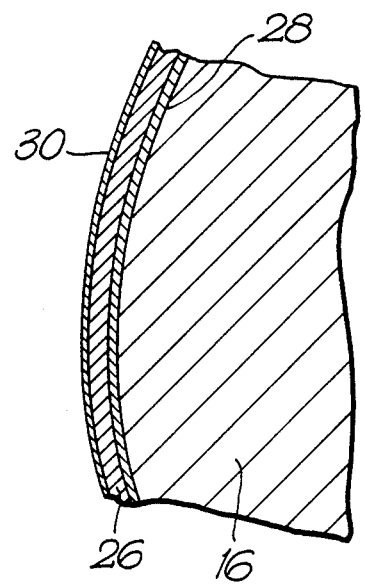

United States Patent [19]

Stewart et al.

[11] Patent Number: 4,933,556
[45] Date of Patent: Jun. 12, 1990

[54] TEMPERATURE MEASURING USING NEUTRON TRANSMISSION

[75] Inventors: Peter A. E. Stewart; Peter H. Fowler, both of Bristol, England

[73] Assignee: Rolls-Royce plc, England

[21] Appl. No.: 63,082

[22] Filed: Jun. 17, 1987

[30] Foreign Application Priority Data

Jun. 25, 1986 [GB] United Kingdom ............... 8615502

[51] Int. Cl.$^5$ .................. G01N 23/09; G01K 11/00
[52] U.S. Cl. .............................. 250/390.01; 250/391; 374/159
[58] Field of Search ............... 250/390 R, 390 K, 391, 250/392; 374/159

[56] References Cited

U.S. PATENT DOCUMENTS 4,839,519  6/1989  Fowler ........................... 250/390.01

FOREIGN PATENT DOCUMENTS 1154653  9/1963  Fed. Rep. of Germany ... 250/390 R
2168805A  6/1986  United Kingdom ............ 250/390 R

OTHER PUBLICATIONS

English Translation of 1,154,653–German Patent to Springer.
Goshchitskii et al., "Detector Which is Sensitive to the Spot at Which Neutrons Have Been Transmitted", *Instrum. and Exp. Tech.*, vol. 14, no. 4, 7/1971, pp. 1002–1005.
Harms et al., "Temperature Sensing by Neutron Transmission", *Nuclear Instruments and Methods*, vol. 104, No. 1, Oct. 1972, p. 217.

*Primary Examiner*—Carolyn E. Fields
*Attorney, Agent, or Firm*—Oliff & Berridge

[57] ABSTRACT

The temperature of an object (10) is measured by monitoring the thermal Doppler broadening of resonances in its neutron transmission characteristics, as neutrons (11) pass through it from a source (12) to a detector (14). Various surfaces (18, 20, 24) of the object are each plated with a different element, such as platinum, iridium and rhenium respectively. By monitoring the Doppler broadening of resonances due to platinum, the temperature of the platinum surface (18) can be determined; and the temperatures of the iridium surface (20) and the rhenium surface (24) are determined likewise.

4 Claims, 2 Drawing Sheets

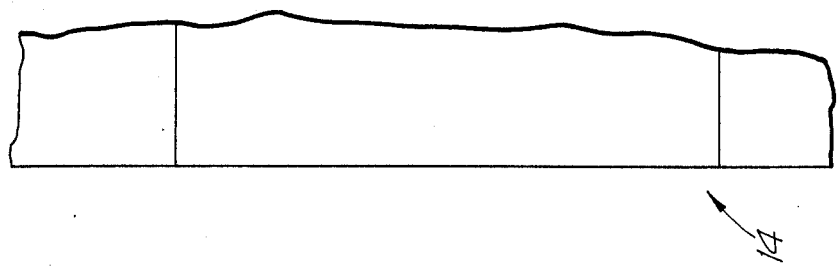
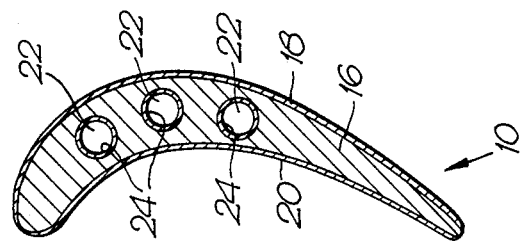
Fig. 1.
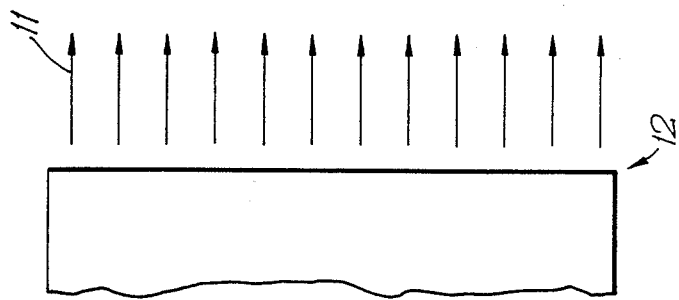

TEMPERATURE MEASURING USING NEUTRON TRANSMISSION

This invention relates to temperature measuring, and may be used, for example, to measure temperatures of an object such as a gas turbine engine component.

U.S. Pat. No. 4,839,519, the disclosure of which is herein incorporated by reference, describes a temperature measurement system involving passing a beam of neutrons through an object to be measured. The nuclei of some elements present in the object have a tendency to scatter or absorb neutrons of given energies, and this gives rise to a characteristic resonance curve if one plots neutron energy against the cross-section for absorbtion or scattering. The width of a given resonance is temperature dependent owing to thermal Doppler broadening. This is useful if the resonance band width is suitably sharp and can be sufficiently broadened by the thermal Doppler effect. More particularly, for the most useful band of neutron energies (1-100eV), such resonances only occur for nuclei having an atomic number greater than or equal to 42 or element molybdenum. The method described in the above patent therefore involves comparison of the experimentally determined shape of a given resonance, caused by the nuclei of one of the component elements of the object, with the known shapes of that resonance at known temperatures and finding the best fit. It has been determined that the temperature of the object can be determined with a high degree of accuracy by such a technique.

The temperature thus determined is the temperature of the element concerned within the bulk material of the object, along the path length of the neutron beam through the object. When studying the temperatures of objects such as gas turbine engine components (e.g., turbine blades or combustion chamber walls) it is frequently the case that different parts of the object have different temperatures and a knowledge of such temperature distributions around the object is particularly valuable. Accordingly, the above patent describe (with reference to FIGS. 23-25 and associated electronic circuitry with reference to FIGS. 26 and 27) a two dimensional detector which can provide temperature information with respect to a two dimensional array of pixels Such information is clearly of great assistance in understanding the temperature distribution across the object being studied, but nevertheless for each pixel the information given relates to the temperature of the bulk material along the path length of the neutrons through the object before they reach that particular pixel of the detector. It provides no way of investigating, for example temperature gradients along that path length. Indeed, if such a temperature gradient exists it is likely to lessen the accuracy of the temperature measurement.

The present invention provides a method of temperature measurement of an object, in which the object is provided with at least one region comprising a material which includes nuclides which are substantially absent from the material of the bulk of the object, the method comprising the steps of:

passing neutrons through the object, detecting a resonance in the transmission of neutrons associated with the said nuclides and determining from the resonance associated with said nuclides the temperature of said region.

The said nuclides could be of an element substantially absent from the bulk material; or of a different isotope of an element which is present in the bulk material.

There may be a plurality of said regions, each including nuclides of respective different kinds, the method including the steps of detecting a respective resonance for each said kind of nuclide and determining therefrom the temperature of each said region. Additionally or alternatively, the method may include the steps of detecting a resonance associated with nuclides present in the material of the bulk of the object, and determining therefrom the temperature of the bulk of the object.

In a preferred embodiment, the said region or regions are one or more layers coated or plated on a respective surface or surfaces of the object. The method then gives an indication of surface temperature(s), as distinct from the temperature of the bulk of the object.

A subject which is of interest to engineers designing gas turbine engines and other devices is the rate of heat transfer or thermal flux through a part of a component. For example, it is of considerable value to be able to measure thermal flux across a thermal barrier or other coating on a surface of an object. In one preferred embodiment of the present invention, this can be achieved by providing a first layer containing nuclides of a first kind on one side of the thermal barrier or other coating, and a second layer containing nuclides of a second kind on the other side of said coating. Practice of the invention in the above manner reveals the temperatures on one side and on the other side of the coating, from which the thermal gradient across the coating and the thermal flux can easily be deduced.

The invention may advantageously be practiced with a neutron detector having positional sensitivity, enabling a temperature measurement to be made in each of a plurality of areas of the object.

The invention also includes apparatus for performing the above methods.

Preferred embodiments of the invention will now be described by way of example, with reference to the accompanying drawings, in which:

FIG. 1 is a schematic diagram (not to scale) showing an example of the invention in use on a gas turbine engine turbine blade, and FIG. 2 shows in cross-section surface portion of another turbine blade on which the invention may be used.

Referring to FIG. 1, there is shown a gas turbine engine turbine blade, placed in the path of neutrons 11 from a pulsed neutron source 12. After passing through the turbine blade 10, the neutrons are detected in a detector 14. Thus far, the arrangement is similar to that described in the Patent discussed above, and the reader is referred to that patent for further details. In particular the detector 14 is of the type discussed with respect to FIGS. 23-27 of that patent, and is therefore capable of providing neutron transmission information with respect to a two dimensional array of pixels, thus permitting temperature information to be obtained from a plurality of different areas of the turbine blade.

The turbine blade 10 is coated on its convex surface with a thin layer 18 of a first material. On its concave surface it is coated with a thin layer 20 of a second material. If the turbine blade is provided with internal passages 22 (e.g., for cooling air) the surfaces of these passages may also be coated with a thin layer 24 of a third material.

The materials of the layers 18, 20 and 24 contain nuclei of an element which is substantially absent from the bulk material 16 of the turbine blade 10, and this should be a different element for each of the layers 18, 20, 24. If the bulk material 16 of the turbine blade is made from a typical nickel based superalloy, containing elements such as nickel, tantalum and hafnium, suitable materials for the layers 18, 20 and 24 are platinum, iridium and rhenium respectively. These materials are preferably plated in pure form onto the surfaces concerned, by any suitable method such as electro-plating or chemical vapour deposition.

Of course, it is important that the respective materials chosen for layers 18, 20, 24 should have (in addition to a suitable sharp resonance which can be used in the temperature determination discussed later) adequate resistance to the temperatures to which the turbine blade is to be subjected. The materials mentioned above, platinum, iridium and rhenium have quite good high temperature properties. At lower temperatures other materials which may be used include silver and gold.

If the turbine blade includes exit holes for cooling air on its outer surface, then of course it is desirable that these should not be plated over when providing the layers 18, 20, 24, since obviously the normal temperature distribution in different parts of the blade would otherwise be affected.

Although the use of pure materials for the layers 18, 20, 24 is discussed above, this is not essential. For example, it would be possible to use a different high temperature alloy in each region, each of the different high temperature alloys containing an element with a detectable resonance, which element is substantially absent from the other regions and from the bulk material 16 of the blade. Alternatively, it is possible to provide one or more regions of the same alloy as the bulk material, but using a different isotope of one of the constituent elements of the alloy to provide a distinct, detectable resonance.

In operation, the pulsed neutrons 11 from the source 12 are passed through the blade and detected by the detector 14, providing for each pixel of the detector 14 a characteristic curve exhibiting resonances, in the manner described in the above mentioned patent. However, whereas the patent provided a temperature measurement based on an element contained in the bulk material, such as tantalum, in the present embodiment such a temperature is obtained from a resonance associated with each of the distinctive elements contained in the layers 18, 20, 24 (platinum, iridium and rhenium in the example described above).

Thus, if the neutrons arriving at a given pixel passed through the layers 18 and 20 in addition to the bulk material 16, one obtains the temperatures of the convex and concave surfaces of the turbine blade at the points associated with that particular pixel. From this information and that obtained from other pixels of the detector one can build up a map of the temperature distribution at all the various points on the convex surface and a similar map in respect of the concave surface. A similar map of the two-dimensional temperature distribution of the bulk material 16 can also be obtained if desired, by detecting a resonance due to a material such as tantalum in the bulk material.

From the pixels which receive neutrons which also pass through the layer 24 inside each cooling passage 22, the temperature of the layer 24 at that particular part of the passage can also be obtained.

Referring now to FIG. 2, there is shown a portion of the surface of another turbine blade, to which a coating 26 has been applied, for example of a conventional ceramic thermal barrier material. It is desired to investigate the thermal properties of the coating 26. Accordingly, the blade is made as follows. Firstly, a layer 28 of a first material, e.g. platinum, is applied to the surface of the bulk material 16 of the blade. Then, the thermal barrier coating 26 is applied over that layer 28. Finally, a second layer 30 of a second material is applied over the coating 26. The second material may for example be iridium. However, it will be appreciated that these are only examples of the materials which may be used for the first and second layers, and the selection of the materials is governed by the same criteria as in the embodiment of FIG. 1.

The turbine blade coated in the manner of FIG. 2 is used in exactly the same way as discussed with reference to FIG. 1, giving a map of the temperature distribution of each of the layers 28 and 30. By comparing the temperatures of the layers 28 and 30 at any given point, and knowing the thickness of the coating 26, it is easy to deduce the thermal gradient across the thermal barrier coating 26 and the thermal flux.

Although the invention has been described in relation to turbine blades, it is clearly also applicable to investigation of the temperature of any other object, and in the gas turbine field may for example be used to investigate combustion chamber walls.

Furthermore, although the invention has been exemplified in terms of coatings placed on the surfaces of the object this is not necessary. It is possible to use the same technique to measure different regions of the bulk material, provided the different regions are made from or doped with appropriate distinct nuclides for which distinct resonances can be detected.

Although the above examples have used more than one coating and thus provided information about different regions or different surfaces of the object, it is of course possible simply to coat one surface with a material such as platinum, iridium or rhenium. When the method according to the invention is practiced on such an object, useful information is obtained about the surface temperature of the coated surface, instead of or in addition to the information about the temperature of the bulk material as provided in the above mentioned patent.

We claim:

1. A method of measuring the temperature of an object at a plurality of regions simultaneously comprising:
   providing in each different region a layer of material containing a different nuclide selected from a range of nuclides of elements of atomic number greater than 41, which possess sharp resonances in their neutron transmission characteristics and which are substantially absent from the material of the bulk of the object,
   passing neutrons through the object,
   detecting Doppler broadening of selected resonances in the neutron transmission characteristics of said different nuclides, and
   determining from the Doppler broadening of the resonances of the different nuclides the temperature of the individual regions.

2. A method according to claim 1, including the steps of detecting a resonance associated with nuclides present in the material of the bulk of the object, and determining therefrom the temperature of the bulk of the object.

3. A method according to claim 1, wherein at least one of said plurality of regions is coated or plated on at least on respective surface of the object.

4. A method according to claim 1, including providing a first layer containing nuclides of a first kind on one side of a thermal barrier or other coating provided on the object, and a second layer containing nuclides of a second kind on the other side of said coating.

* * * * *